United States Patent
Wong et al.

(10) Patent No.: US 8,892,793 B1
(45) Date of Patent: Nov. 18, 2014

(54) TECHNIQUES FOR OVERSAMPLING A DATA STREAM IN AN INTEGRATED CIRCUIT

(75) Inventors: Zhi Y. Wong, San Jose, CA (US); Albert Lee, San Jose, CA (US); Keen Yew Loke, Bayan Lepas (MY); Kia Leong Tan, Bayan Lepas (MY); Paul B. Ekas, Redwood City, CA (US); Siew Leong Lam, Petaling Jaya (MY)

(73) Assignee: Altera Corporation, San Jose, CA (US)

( * ) Notice: Subject to any disclaimer, the term of this patent is extended or adjusted under 35 U.S.C. 154(b) by 412 days.

(21) Appl. No.: 13/279,145

(22) Filed: Oct. 21, 2011

(51) Int. Cl.
*G06F 3/00* (2006.01)
*G06F 5/00* (2006.01)

(52) U.S. Cl.
USPC .......................................................... 710/60

(58) Field of Classification Search
USPC ............................................................ 710/60
See application file for complete search history.

(56) References Cited

U.S. PATENT DOCUMENTS

| 8,548,085 B2 * | 10/2013 | McGowan et al. ............ 375/267 |
| 2010/0232798 A1 * | 9/2010 | Kozaki et al. .................. 398/98 |
| 2011/0176808 A1 * | 7/2011 | He et al. ......................... 398/58 |

* cited by examiner

*Primary Examiner* — Chun-Kuan Lee
(74) *Attorney, Agent, or Firm* — Womble, Carlyle, Sandridge & Rice

(57) ABSTRACT

Techniques for sampling input data streams with an integrated circuit (IC) are provided. The technique includes receiving a first input stream at a first operating rate. The first input stream is transmitted to a plurality of subsequent transceiver channels on the IC. The first input stream is then sampled at a second operating rate at each of the plurality of subsequent transceiver channels with each of the plurality of subsequent transceiver channels outputting a data stream at the second operating rate. The data stream from each of the plurality of subsequent transceiver channels is adjusted. A data stream from one of the plurality of subsequent transceiver channels is selected as an output of the IC.

25 Claims, 6 Drawing Sheets

US 8,892,793 B1

TECHNIQUES FOR OVERSAMPLING A DATA STREAM IN AN INTEGRATED CIRCUIT

BACKGROUND

Integrated circuits (IC) are used in a variety of applications. Generally speaking, programmable logic devices (PLDs) such as field-programmable gate arrays (FPGAs) and application-specific integrated circuits (ASICs) are devices that include generic structures and logic blocks that can be configured to perform different functions. Some of these logic blocks include logic circuitry, registers, input/output (I/O) blocks, transceiver channels, etc. These circuitry elements are programmable to perform any of a variety of tasks and functions. For instance, PLDs with embedded high-speed serial transceiver blocks can be used to implement a Gigabit Passive Optical Network (GPON) protocol.

Generally speaking, a passive optical network (PON) is a network architecture that brings fiber cabling and signals to a user node, e.g., a home, using a point-to-multipoint scheme that enables a single optical fiber to serve multiple premises. The GPON protocol is a specific PON standard that provides a higher bandwidth, higher efficiency and a generally higher quality of service for high-speed communication traffic. However, certain problems that may arise in a GPON implementation need to be addressed. Some of the challenges when implementing a GPON protocol include, among others, long dead time, multiple phase jumps and short preamble requirements.

Typically, a PON network includes an optical line terminal (OLT) which is normally located at the service provider's end and multiple optical network units (ONUs) near all the end users. A splitter or a combiner is usually placed in between the OLT and the ONUs. Downstream signals from the OLT is split and sent to different ONUs and upstream signals from the users are combined and sent to the OLT. Generally speaking, each user has an assigned slot that allows the OLT to receive packets from each different user. High-speed signals from each different user usually have different phases and hence need to be sampled quickly and accurately.

Therefore, it is desirable to have a sampling technique that is able to sample all these high-speed signals accurately. It is also desirable to have a sampling technique that can handle long dead time and multiple phase jump angles in data streams.

SUMMARY

The embodiments include circuits and techniques to implement an input/output (I/O) protocol on an integrated circuit (IC).

It should be appreciated that the present embodiments can be implemented in numerous ways, such as a process an apparatus, a system, a device or a method on a computer readable medium. Several inventive embodiments are described below.

In one embodiment, a method of operating an IC is disclosed. The method includes receiving a first input stream at a first operating rate. The first input stream is then transmitted to a plurality of transceiver channels where the first input stream is sampled. Each of the transceiver channels samples the first input stream at a second operating rate. Each of the plurality of transceiver channels outputs a data stream at the second operating rate. The data stream from each of the plurality of subsequent transceiver channels is adjusted and the data stream from one of the plurality of transceiver channels is selected as an output of the IC.

In another embodiment, a method of implementing an input/output (I/O) protocol on a programmable logic device (PLD), is provided. The method includes initiating a calibration operation at a plurality of I/O channels on the PLD. The PLD outputs a ready signal upon completion of the calibration operation. An input stream having a first operating rate is received at a first I/O channel. The input stream is then sampled at a second operating rate at an I/O channel from the plurality of I/O channels that is serially connected to the first I/O channel. The serially connected I/O channel outputs a data stream based on the input stream at the second operating rate. The data stream is then realigned based on the earlier calibration operation.

In another embodiment, an integrated circuit (IC) is provided. The IC includes a first transceiver channel coupled to receive a data stream at a first operating rate and a second transceiver channel coupled to the first transceiver channel. The data stream is sampled at the second transceiver channel at a second operating rate. A realignment module is coupled to receive an output from the second transceiver channel. The realignment module is operable to adjust the output from the second transceiver based on a predetermined data pattern. A down-sampling module that selects a realigned data stream is coupled to the realignment module.

In yet another embodiment, another IC is provided. The IC includes a plurality of serially connected transceiver channels. A first transceiver channel from the plurality of serially connected channels has a first receiver that is coupled to receive an input stream at a first operating rate. A first transmitter at the first transceiver channel is coupled to receive the input from the first receiver and a second transceiver channel coupled to the first transceiver receives the input stream at a second receiver. The input stream is sampled at a second operating rate at the second transceiver channel. A calibration block is coupled to the second receiver of the second transceiver channel and operable to distribute a plurality of sampling points at the second transceiver channel.

Other aspects of the embodiments will become apparent from the following detailed description, taken in conjunction with the accompanying drawings, illustrating by way of example the principles of the embodiments.

BRIEF DESCRIPTION OF THE DRAWINGS

The exemplary embodiments may best be understood by reference to the following description taken in conjunction with the accompanying drawings.

DETAILED DESCRIPTION

The exemplary embodiments include circuits and techniques to implement an input/output (I/O) protocol on an integrated circuit (IC).

It will be obvious, however, to one skilled in the art, that the exemplary embodiments may be practiced without some or all of these specific details. In other instances, well-known operations have not been described in detail in order not to unnecessarily obscure the embodiments.

Figure 1:
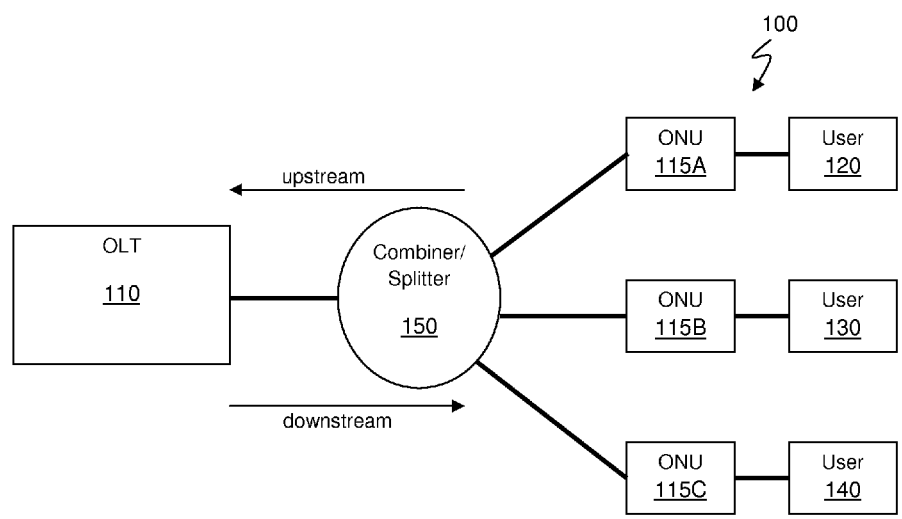
FIG. 1, meant to be illustrative and not limiting, shows a point-to-multipoint network architecture that may include aspects of the present exemplary embodiments.

The embodiments described herein provide circuits and techniques for over-sampling data streams with an integrated circuit (IC). It should be appreciated that even though a Gigabit Passive Optical Network (GPON) protocol is used herein as an exemplary embodiment, other high-speed protocols may be oversampled using the techniques described herein. FIG. 1, meant to be illustrative and not limiting, shows a point-to-multipoint network architecture 100 that may include aspects of the exemplary embodiments. In one embodiment, network architecture 100 is a GPON network architecture with high-speed data streams travelling upstream and downstream.

Referring still to FIG. 1, network architecture 100 includes optical line terminal (OLT) unit 110 and multiple optical network units (ONUs) or optical network terminals (ONT) 115A-115C near the end users 120, 130 and 140. In one embodiment, OLT unit 110 is a central office node located at the service provider's central office. Data from users 120, 130 and 140 travel upstream to OLT unit 110 through the respective ONUs 115A, 115B and 115C. Optical combiner/splitter unit 150 combines all the data from users 120, 130 and 140 before sending the data upstream to OLT unit 110. OLT unit 110 sends data downstream to users 120, 130 and 140 through respective ONUs 115A, 115B and 115C. When the data is travelling downstream from OLT unit 110, the data is split by optical combiner/splitter unit 150 into multiple data streams that are then sent to the respective end users.

Referring still to FIG. 1, OLT unit 110 may include an integrated circuit (IC) that implements a GPON protocol. OLT unit 110 allocates upstream bandwidth to ONUs 115A, 115B and 115C. Data from ONUs 115A, 115B and 115C may collide if the data is transmitted at random times. It should be appreciated that ONUs 115A, 115B and 115C and user nodes 120, 130 and 140 may lie at varying distances from OLT unit 110 and as such, the transmission delay from each ONU may be unique. In other words, data from users 120, 130 and 140 may reach OLT unit 110 at different times. Generally, phase jumps also exist between data streams from different users or nodes 120, 130 and 140. For instance, data from user 130 may be phase shifted by 180° compared to data from user 120. In order to accurately sample all the high-speed data from users 120, 130 and 140, the GPON protocol in OLT unit 110 has to accommodate the multiple phase jumps that exist between all the different data streams.

Figure 2:
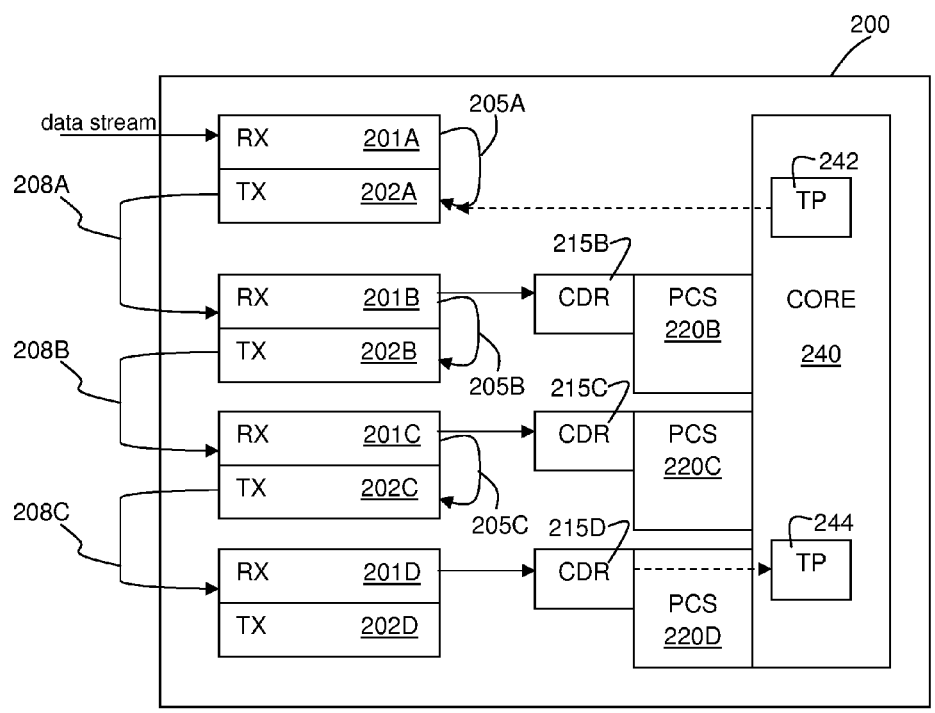
FIG. 2, meant to be illustrative and not limiting, shows an IC with I/O channels for oversampling data streams as one embodiment.

FIG. 2, meant to be illustrative and not limiting, shows IC 200 with I/O channels for oversampling data streams as one embodiment. In the embodiment of FIG. 2, four serially connected transceiver channels are used to sample a single data stream. IC 200 includes a core region 240 that may include logic elements that are used to perform a variety of functions, details of which are not shown in order to not obscure the embodiments. During power up or reset, IC 200 may go into a self-calibration mode. In one embodiment, this calibration runs automatically upon power up or reset and does not require any input or feedback from the user or any external circuitry that may be coupled to IC 200. In the embodiment of FIG. 2, core region 240 may include a training pattern that is used to calibrate the I/O channels in IC 200. It should be appreciated that transceiver channels with receivers 201A-201D and transmitters 202A-202D are shown in the embodiment of FIG. 2.

Referring still to FIG. 2, during calibration mode, training pattern 242 is sent to transmitter channel 202A and the same pattern is looped-back to receiver channel 201B through loopback connection 208A. According to one embodiment, training pattern 242 is a pre-determined or repeated data pattern that is sent to the different transmitter channels. The training pattern received at receiver channel 201B is sent to transmitter 202B through internal loopback connection 205B. Each subsequent transceiver channel receives training pattern 242 through subsequent loopback connections 208B, 205C and 208C as illustrated in the embodiment of FIG. 2. The transceiver channels are calibrated based on the training pattern and the calibration is checked with training pattern 244. In an exemplary embodiment, block 244 contains a comparator that compares the calibration of all the transceiver channels with the training pattern. In some embodiments, the training pattern is a repeated data pattern that is sent to every transceiver channel on the IC to calibrate each of the transceiver channels. In one such embodiment, the training pattern is a non-self-repeating bit pattern. In other words, the bit pattern does not repeat itself when shifted to the left or right. Once the calibration is performed, IC 200 may send a ready signal to the end user or any other external circuitry that is connected to IC 200 and IC 200 is put into operation mode.

Continuing from FIG. 2, when IC 200 is in operation mode, a data stream is received at receiver 201A of a first transceiver channel. The data stream is transmitted to transmitter 202A of the first transceiver channel through internal loopback connection 205A. The data stream is transmitted through each of the subsequent transceiver channels through loopback connections 208A-208C and internal loopback connection 205B and 205C. In one embodiment, the data stream received at receiver 201A has a first operating rate and is sampled at twice the rate at each of the following transceiver channels. For example, the data stream may be a 2.5 Gbps data stream and at every transceiver channel, the data stream is sampled at a rate of 5 Gbps. In other words, each of receiver channels 201B-201D samples the data stream twice. With three different receiver channels 201B-201D oversampling the data twice, the data stream will be sampled six times in the embodiment of FIG. 2. It should be appreciated that even though only four transceiver channels are shown in the embodiment of FIG. 2, more or fewer transceiver channels can be connected to perform the oversampling technique as described.

Referring still to FIG. 2, the data stream at each of the transceiver channels in IC 200 is oversampled at different phases controlled by a respective clock data recovery (CDR) block 215B-215D. It should be appreciated that each of CDR blocks 215A-215D may include a phase interpolator to sample the data stream at different phases. It should also be appreciated that CDR blocks 215A-215D may be included as part of each of the respective receiver channels 201A-201D in one embodiment. The oversampled data stream from each of the transceiver channels traverses through physical coding sublayer (PCS) blocks 220B-220D, respectively. It should be appreciated that PCS blocks 220B-220D include logic resources, e.g., encoder/decoder blocks, scrambler/descrambler blocks, buffers, etc., to implement the physical layer of a particular protocol. Logic resources and connections within each of PCS block 220A-220D are not shown in detail in order to not unnecessarily obscure the embodiments. The oversampled data streams are then sent to core 240 of IC 200 to be further processed. In one embodiment, the PCS data streams are sent to a logic block within core 240 of IC 200, details of which are described below.

Figure 3:
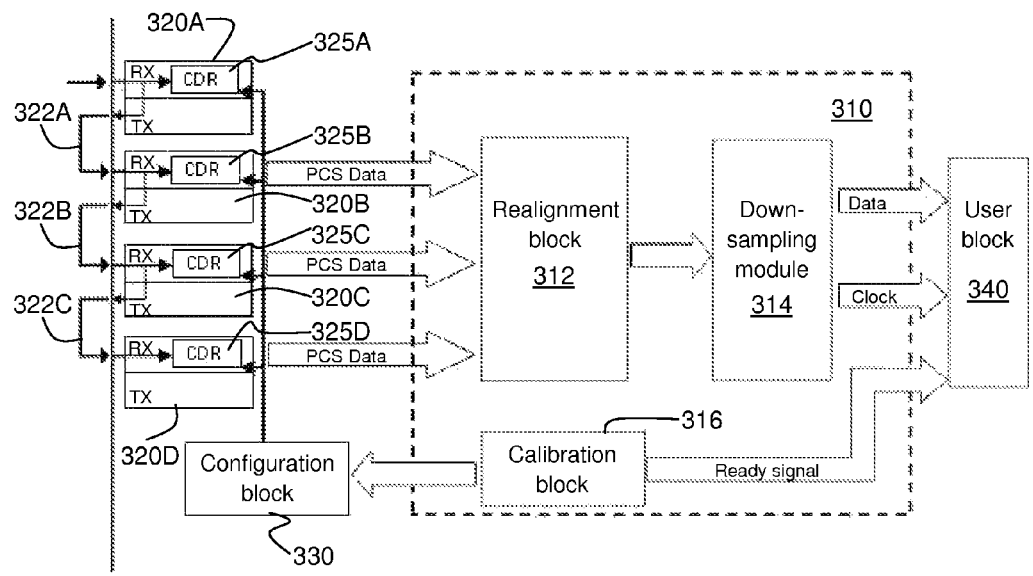
FIG. 3, meant to be illustrative and not limiting, shows a logic block within an IC connected to multiple I/O channels as one embodiment.

FIG. 3, meant to be illustrative and not limiting, shows logic block 310 within an IC connected to multiple I/O channels 320A-320D as one embodiment. In one embodiment, logic block 310 is an intellectual property (IP) block that is used to sample incoming GPON data streams. In an exemplary embodiment, logic block 310 is placed in a core logic region of an IC similar to core region 240 of FIG. 2. The illustrative embodiment of FIG. 3 shows four transceiver channels 320A-320D interfacing with one single data channel, e.g., a GPON channel. Each of the transceiver channels 320A-320D includes a receiver (RX) and a transmitter (TX). According to one embodiment, transceiver channel 320A is an input port or an input pin that is connected to receive incoming data streams from an external source.

Referring still to FIG. 3, data stream received at RX of transceiver channel 320A is looped back through connection path 322A and transmitted out from TX of transceiver channel 320A to transceiver channel 320B. The same data stream is transmitted in the same manner from transceiver channel 320B to all subsequent transceiver channels 320C-320D through connection paths 322B-322C. In one embodiment, logic block 310 is a block on an IC that is disposed on a printed circuit board (PCB) and connections 322A-322C are loopback connections on the PCB.

Continuing from FIG. 3, the data stream received at transceiver channel 320A is sampled at each of transceiver channels 320B-320D at twice the operating rate of the data stream received. For instance, if transceiver channel 320A receives a data stream operating at 2.5 Gbps, the same data stream will be sampled at twice the data rate, i.e., 5 Gbps, at every subsequent transceiver channel 320B-320D. Therefore, with three different transceiver channels, each sampling the same data stream at twice the operating rate, the data stream will effectively be sampled at six times the operating rate of the data stream. The oversampled data from transceiver channels 320B-320D are coupled to realignment block 312. In one embodiment, each transceiver channel 320B-320D sends two sample points to realignment block 312.

Referring still to FIG. 3, data streams from transceiver channels 320B-320D are realigned at realignment block 312. In one embodiment, realignment block 312 includes comparators and counters that are coupled together to compare the data streams received from transceiver channels 320B-320D and adjust the data streams accordingly. After the realignment, the combined data stream is coupled to a down-sampling module 314. An output data stream, together with a clock signal, is provided by down-sampling module 314 to user block 340. In one embodiment, down-sampling module 314 selects a data value that is relatively close to the middle of a data window. It should be appreciated that user block 340 may be an end user or external circuitry that is connected to logic block 310.

Continuing from FIG. 3, according to one embodiment, logic block 310 is an IP block on an IC device and transceiver channels 320A-320D are I/O channels of the IC device. In such an embodiment, during power up or reset, the IC device will initiate a self-calibration operation to calibrate transceiver channels 320A-320D. Calibration block 316 moves sampling points in transceiver channels 320A-320D to ensure that the sample data streams at each of the transceiver channels will be relatively evenly distributed. Configuration block 330 calibrates each of transceiver channels 320A-320D. According to one embodiment, a pre-determined data pattern is sent to transceiver channels 320A-320D to calibrate each of the channels. Once the calibration operation is complete, the IC device may output a "ready" signal to indicate that all the transceiver channels are ready to sample incoming data streams.

Figure 4:
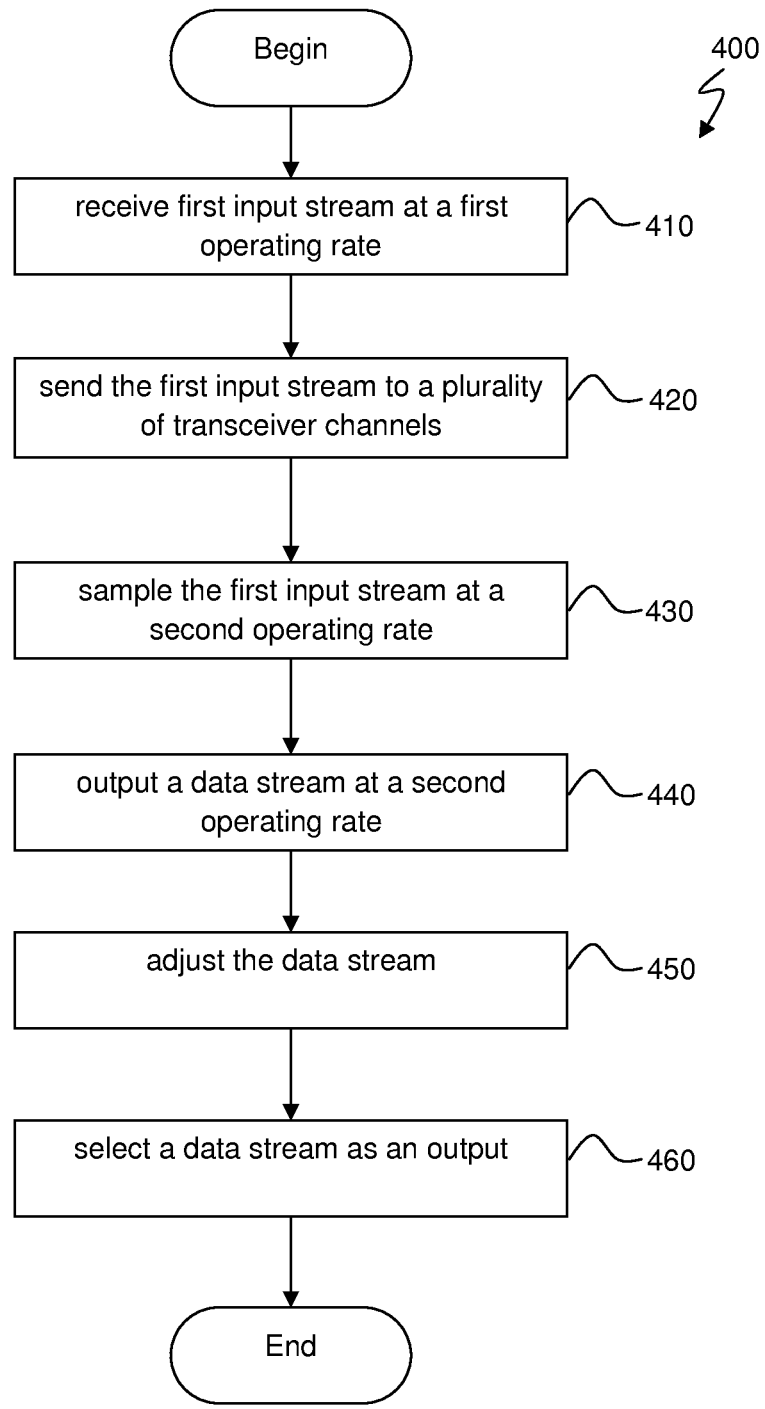
FIG. 4, meant to be illustrative and not limiting, shows a method flow for operating an IC as another embodiment.

FIG. 4, meant to be illustrative and not limiting, shows flow 400 for operating an IC as another embodiment. Flow 400 begins by receiving a first input stream at a first operating rate in operation 410. The first input stream is transmitted to a plurality of transceiver channels in operation 420. In the embodiment of FIG. 3, the first input stream is transmitted to the plurality of transceiver channels through loopback connections 322A-322C. The first input stream is then sampled at a second operating rate at each of the plurality of transceiver channels in operation 430. According to one embodiment, the second operating rate is approximately twice as fast as the first operating rate.

Continuing from FIG. 4, each of the transceiver channels outputs a data stream at the second operating rate in operation 440. The data stream from each of the transceiver channels is adjusted according to a self-calibration operation in operation 450. According to one embodiment, the IC performs the self-calibration operation upon power up prior to receiving the first input stream. During the self-calibration operation, a data pattern is transmitted to each of the transceiver channels on the IC for calibration purposes. In one embodiment, the data pattern is a "training pattern" and each of the transceiver channels is calibrated or adjusted based on the "training pattern". Once all the transceiver channels have been properly calibrated, the IC may output a "ready" signal and begin receiving and sampling input streams. The data stream from one of the transceiver channels is selected as an output of the IC in operation 460.

Figure 5:
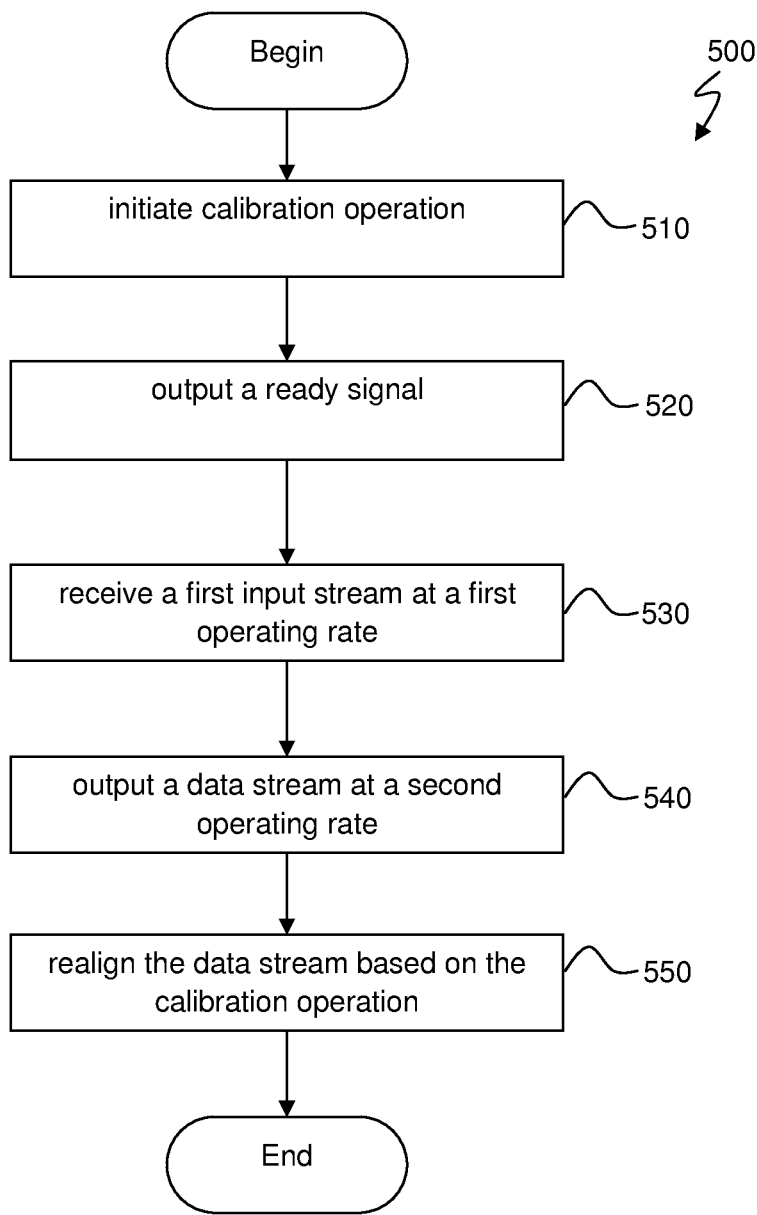
FIG. 5, meant to be illustrative and not limiting, shows a method flow for implementing an I/O protocol on a programmable logic device (PLD) as one embodiment.

FIG. 5, meant to be illustrative and not limiting, shows flow 500 for implementing an I/O protocol on a programmable logic device (PLD) as one embodiment. Flow 500 begins by initiating a calibration operation at a plurality of I/O channels on the PLD in operation 510. The PLD outputs a ready signal in operation 520 upon completion of the calibration operation. In the embodiment of FIG. 3, calibration block 316 sends a ready signal to user block 340 once transceiver channels 320A-320D have been calibrated. A first input stream with a first operating rate is received at a first I/O channel of the plurality of I/O channels in operation 530. The input stream is then sampled at an I/O channel from the plurality of I/O channels that is serially connected to the first I/O channel. According to one embodiment, the input stream is sampled at a different operating rate and at a different phase at the serially connected I/O channel. The serially connected I/O channel outputs a data stream based on the input stream at a second operating rate in operation 540. The data stream is then realigned in operation 550 based on the earlier calibration operation.

Figure 6:
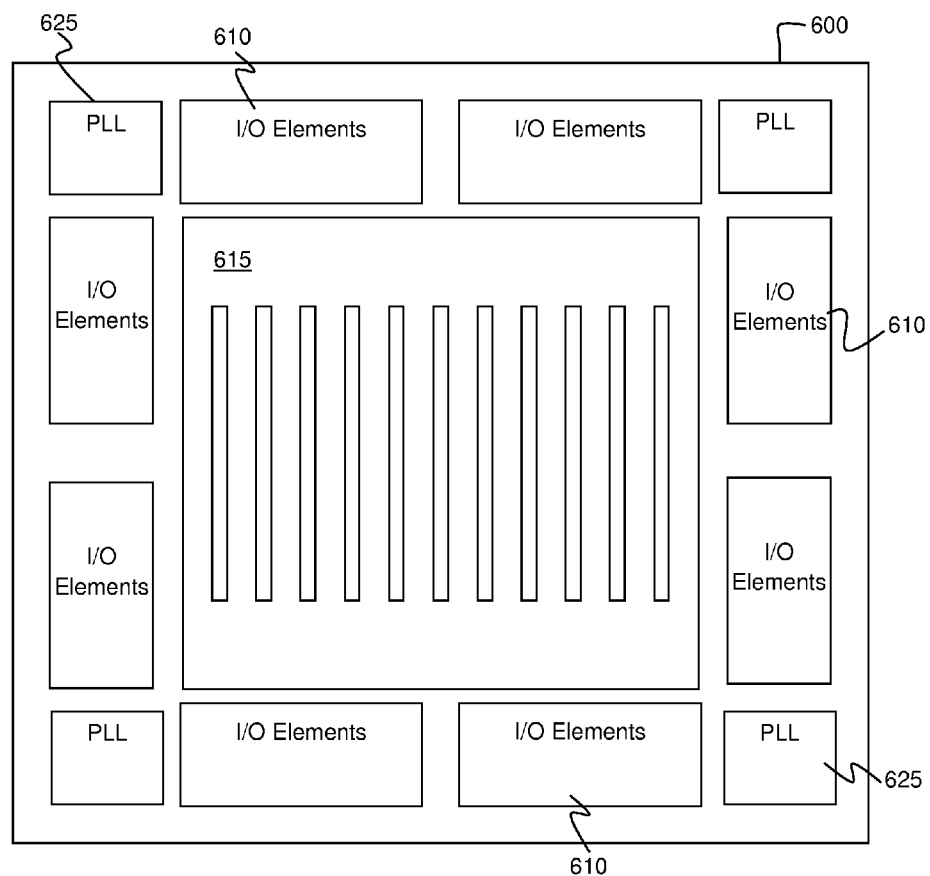
FIG. 6, meant to be illustrative and not limiting, shows a simplified block diagram of a PLD that can include aspects of the present exemplary embodiments.

FIG. 6, meant to be illustrative and not limiting, shows a simplified block diagram of PLD 600 that can include aspects of the present exemplary embodiments. Programmable device 600 includes logic region 615 and I/O elements 610. I/O elements 610 may include a plurality of transceiver channels similar to transceiver channels 320A-320D as shown in the embodiment of FIG. 3. Other auxiliary circuits such as phase-locked loops (PLLs) 625 for clock generation and timing, can be located outside the core logic region 615, e.g., at corners of programmable device 600 and adjacent to I/O elements 610. Logic region 615 may be populated with logic cells which include, among other things, at the most basic level, "logic elements" (LEs). LEs may include look-up table-based logic regions and these logic elements may be grouped into "Logic Array Blocks" (LABs). The logic elements and groups of logic elements or LABs can be configured to perform logical functions desired by the user. Logic region 615 may also include logic circuitry that are coupled together as IP blocks similar to logic block 310 as shown in the embodiment of FIG. 3. According to one embodiment, PLD 600 can perform any or all of the operations illustrated in FIG. 5.

The embodiments, thus far, were described with respect to integrated circuits. The method and apparatus described herein may be incorporated into any suitable circuit. For example, the method and apparatus may be incorporated into numerous types of devices such as microprocessors or programmable logic devices. Exemplary programmable logic devices include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing exemplary embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of operating an integrated circuit (IC), comprising:
   receiving, at a receiver of a first transceiver channel of the IC, a data stream at a first operating rate;
   transmitting the data stream to a transmitter of the first transceiver channel of the IC;
   transmitting the data stream from the transmitter of the first transceiver channel of the IC through a plurality of subsequent serially connected transceiver channels of the IC;
   sampling the data stream at a second operating rate at each of the plurality of subsequent serially connected transceiver channels, wherein the data stream is sampled at a different phase at each of the plurality of subsequent serially connected transceiver channels;
   outputting, from each of the plurality of subsequent serially connected transceiver channels, a data stream at the second operating rate;
   adjusting the data stream from each of the plurality of subsequent serially connected transceiver channels; and
   selecting the data stream from one of the plurality of subsequent serially connected transceiver channels as an output stream of the IC.

2. The method of claim 1, further comprising:
   performing a self-calibration operation upon power up of the IC.

3. The method of claim 2, wherein the self-calibration operation comprises:
   transmitting a data pattern to the first transceiver channel; and
   transmitting the data pattern from the first transceiver channel to the plurality of subsequent serially connected transceiver channels, wherein each of the plurality of subsequent serially connected transceiver channels is calibrated based on the data pattern.

4. The method of claim 2, further comprising:
   outputting a ready signal upon completion of calibration of the plurality of subsequent serially connected transceiver channels.

5. The method of claim 3, wherein the data pattern is a training pattern and the data stream from each of the plurality of subsequent serially connected transceiver channels is adjusted according to the training pattern.

6. The method of claim 1, wherein the second operating rate is at least twice as fast as the first operating rate.

7. The method of claim 1, further comprising:
   providing a clock signal, wherein the clock signal is synchronized with the output stream.

8. The method of claim 1, wherein the adjusting further comprises:
   comparing the data stream from each of the plurality of subsequent serially connected transceiver channels with a predetermined data pattern and adjusting the data stream based on the predetermined data pattern.

9. A method of implementing an input/output (I/O) protocol on a programmable logic device (PLD), comprising:
   initiating a calibration operation;
   outputting a ready signal upon completion of the calibration operation;
   receiving, at a receiver of a first I/O channel of a plurality of serially connected I/O channels, an input stream having a first operating rate;
   transmitting the input stream to a transmitter of the first I/O channel;
   transmitting the input stream from the transmitter of the first I/O channel to a second I/O channel of the plurality of serially connected I/O channels;
   sampling the input stream at a second operating rate at the second I/O channel of the plurality of serially connected I/O channels, wherein the second I/O channel is serially connected to the first I/O channel, and wherein the input stream is sampled at a different phase at the second I/O channel;

outputting a data stream at the second I/O channel based on the input stream at the second operating rate; and realigning the data stream based on the calibration operation.

10. The method of claim 9, wherein the calibration operation comprises:

sending a repeated data pattern to first I/O channel;

looping the repeated data pattern from the first I/O channel to the second I/O channel; and calibrating the first and the second I/O channels based on the data pattern.

11. The method of claim 9, wherein the second operating rate is faster than the first operating rate.

12. The method of claim 9, wherein each of the plurality of serially connected I/O channels is locked to a reference clock.

13. The method of claim 9, wherein the input stream is sampled at a different phase at each of the plurality of serially connected I/O channels.

14. An integrated circuit (IC), comprising:

a first transceiver channel configured to receive a data stream at a first operating rate and transmit the data stream to a second transceiver channel;

the second transceiver channel coupled to the first transceiver channel, wherein the second transceiver channel is configured to receive the data stream transmitted by the first transceiver and to sample the data stream at a second operating rate, and wherein the data stream is sampled at a different phase at the second transceiver channel;

a third transceiver channel coupled to the second transceiver channel, wherein the third transceiver channel is configured to receive the data stream from the second transceiver channel;

a realignment module coupled to receive an output from the second transceiver channel, wherein the realignment module is configured to adjust the output from the second transceiver based on a predetermined data pattern; and a down-sampling module coupled to the realignment module, wherein the down-sampling module is configured to select a realigned data stream and a synchronous clock as outputs.

15. The IC of claim 14, wherein the realignment module comprises:

a plurality of counters and a plurality of comparators coupled together, wherein the plurality of comparators is configured to compare the output from the second transceiver channel.

16. The IC of claim 14, further comprising:

a calibration block between the second transceiver channel and the realignment module, wherein the calibration block is configured to distribute a plurality of sampling points at the second transceiver channel, and wherein the realignment module is configured to receive a calibrated output from the second transceiver channel.

17. The IC of claim 14, wherein the third transceiver channel is configured to sample the data at a third operating rate.

18. The IC of claim 17, wherein an output from the third transceiver channel is coupled to the realignment module.

19. The IC of claim 14, wherein the IC is placed on a printed circuit board (PCB) and wherein the second transceiver channel is coupled to the first transceiver channel through a loopback connection on the PCB, and wherein the PCB is entirely within one of: an optical line terminal (OLT) or an optical network unit (ONU).

20. The IC of claim 14, wherein the second operating rate is at least two times as fast as the first operating rate.

21. An integrated circuit (IC), comprising:

a plurality of serially connected transceiver channels;

a first transceiver channel from the plurality of serially connected channels configured to receive an input stream at a first operating rate at a first receiver of the first transceiver channel;

a transmitter of the first transceiver channel configured to receive the input stream from the first receiver and configured to transmit the input stream;

a second transceiver channel coupled to the transmitter of the first transceiver channel and configured to receive the input stream, as transmitted by the transmitter of the first transceiver channel, at a second receiver of the second transceiver channel, wherein the input stream is sampled at a second operating rate at the second transceiver channel, and wherein the input stream is sampled at a different phase at the second transceiver channel;

a third transceiver channel coupled to a transmitter of the second transceiver channel and configured to receive the input stream from the transmitter of the second transceiver channel; and a calibration block coupled to the second receiver wherein the calibration block is configured to distribute a plurality of sampling points at the second transceiver channel.

22. The IC of claim 21, further comprising:

a realignment module configured to receive an output from the second transceiver channel, wherein the realignment module is configured to adjust the output based on a predetermined data pattern.

23. The IC of claim 21, wherein the second operating rate is at least two times as fast as the first operating rate.

24. The IC of claim 21, further comprising:

the third transceiver channel configured to receive the input stream at a third receiver of the third transceiver channel, wherein the input stream is sampled at the second operating rate at the third transceiver channel; and a second calibration block coupled to the third receiver, wherein the second calibration block is configured to distribute a second plurality of sampling points at the third transceiver channel.

25. The IC of claim 21, wherein the input stream is not a frequency hopping signal, wherein the calibration block includes a phase interpolator, and wherein the input stream is sampled at a plurality of different phases.

* * * * *